Patented Apr. 6, 1943

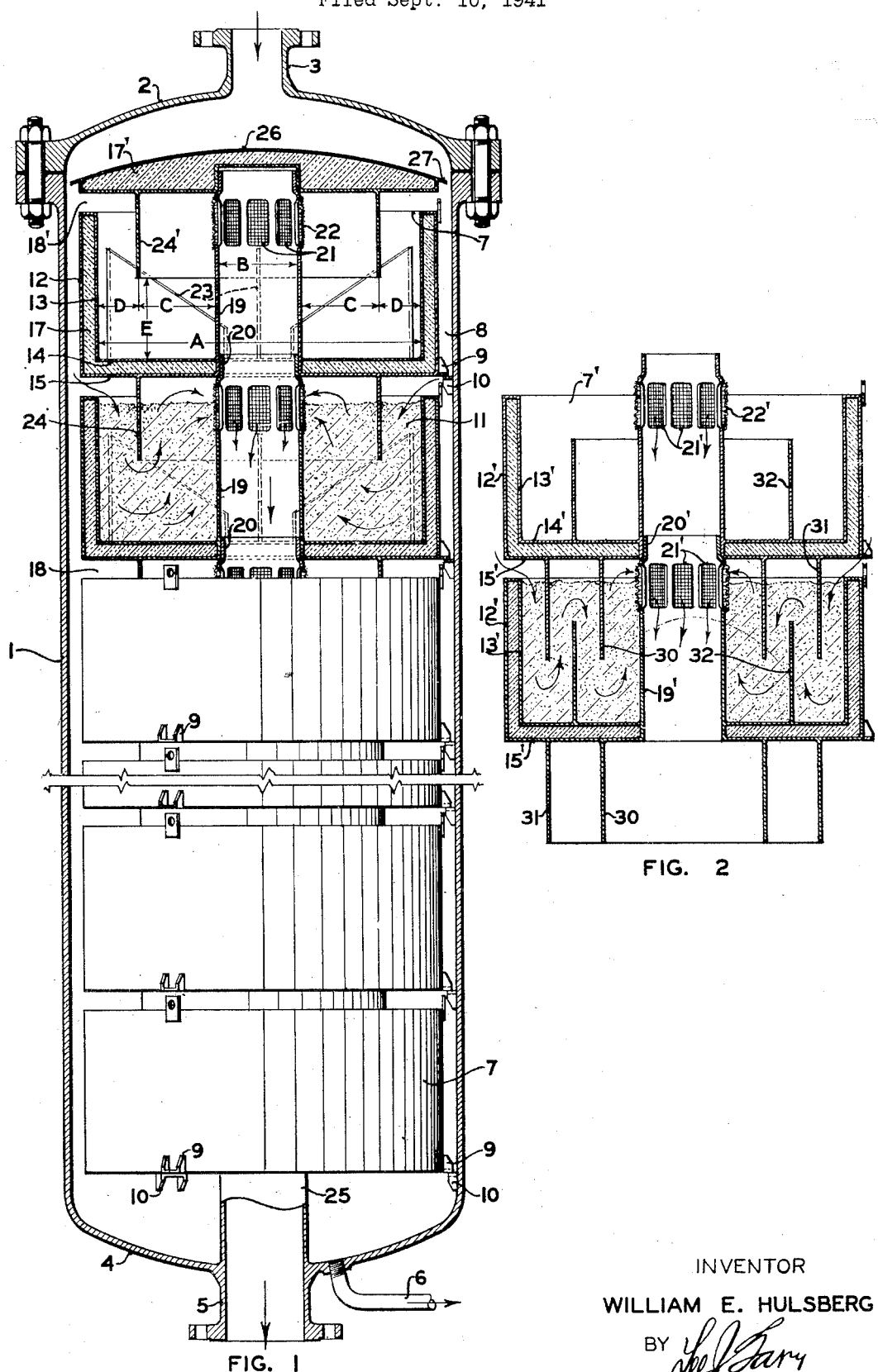

2,315,525

UNITED STATES PATENT OFFICE 2,315,525

REACTION VESSEL

William E. Hulsberg, Chicago, Ill., assignor to Universal Oil Products Company, Chicago, Ill., a corporation of Delaware Application September 10, 1941, Serial No. 410,269

12 Claims. (Cl. 23—288)

The invention relates to an improved form of vessel in which to conduct reactions in the presence of solid granular contact material or catalyst.

The reactor provided is of the type employing a plurality of superimposed trays in each of which a bed of the catalyst or contact material is disposed. Reactors of this general type have been previously proposed for conducting catalytically promoted hydrocarbon conversion reactions and the like and for periodic regeneration of the catalyst or contact mass to restore its activity.

In the reactor herein provided, as in certain previously proposed forms of the same general type of reactor, provision is made for dividing the incoming stream of fluid reactants to be converted or the reactivating fluid into a plurality of separate streams of substantially equal volume which are passed in parallel through the several beds of catalyst or contact mass. It also obviates the usual expedient of supplying heat to or abstracting heat from the reaction by circulating a convective fluid through the reactor in indirect contact with the catalyst or contact material, the reactants and reactivating fluid. Both of these benefits result from the relatively short path of travel for the reactants and reactivating fluid through the catalyst or contact mass. In an endothermic reaction, such as catalytic cracking, dehydrogenation, etc., the reactants may be supplied to the reaction vessel at the temperature required to accomplish their conversion upon contact with the catalyst and their drop in temperature as they flow through the catalyst bed may be so limited that the reaction is not appreciably retarded or otherwise adversely affected. In exothermic operation, such as, for example, regeneration of the catalyst by burning deleterious combustible deposits therefrom in a stream of oxygen-containing gases, the reactivating gases may be supplied to the reactor at a temperature sufficiently high to initiate combustion of the deleterious deposits and their rise in temperature as they pass through the catalyst bed may be so limited that temperatures which result in permanent impairment to the activity of the catalyst or other damage are not reached.

In previously proposed reactors of this general type, the flow of reactants and reactivating gases is either transversely through an annular bed or in a general upward or downward direction through the beds.

In the present invention I employ a substantially cylindrical baffle which extends from the lower portion of each tray, with the exception of the lowermost tray of the assembly, into the bed of catalyst or contact material on the succeeding lower tray, around which baffle the reactants or reactivating fluid, as the case may be, flow in passing through the bed so that their direction is substantially reversed within the bed. Thus, the reactants or reactivating gases enter the bed in a downward direction on one side of the baffle and leave the bed in an upward direction on the opposite side of the baffle.

The trays and the beds of catalyst therein may be as deep or as shallow as desired, so as to obtain substantially the same or a greater or lesser length of travel for the reactants and reactivating gases therethrough as compared with previous reactors of the same catalyst capacity. Thus no penalty need be suffered on account of the reversed flow employed in the beds due to the baffle.

This construction has the advantage of materially simplifying the problem, encountered in previous reactors of this general form, of preventing short circuiting of the reactants and reactivating gases from the inlet to the outlet of the trays. The baffle and the bed of catalyst or contact material into which it extends serve as an effective seal to prevent such short-circuiting and obviate the use of troublesome packing and the like between the superimposed trays.

The features and the advantages of the invention will be more readily apparent with reference to the accompanying diagrammatic drawing and the following description thereof.

In the drawing Fig. 1 is an elevational view, shown partially in longitudinal section, of one specific form of the reactor provided by the invention.

Fig. 2 is a sectional elevation of a modified form of trays for use in a reactor otherwise like that illustrated in Fig. 1.

Referring to Fig. 1 of the drawing, the metal shell of the reactor, which, in this particular instance, is substantially cylindrical, is designated by the reference numeral 1 and is provided with a removable upper head 2 which is flanged and bolted to a flange provided on the shell, or which may be detachably secured thereto in any other conventional manner. An inlet nozzle 3 for reactants and reactivating gases is provided on the upper head 2. A head 4, which in this particular instance is formed integral with the shell, is provided at the lower end of the latter and carries an outlet nozzle 5 for reaction products and for spent or partially spent reactivating gases. A drain connection 6 is also provided on the lower head 4.

A plurality of superimposed metal trays 7 is provided within shell 1, these trays being somewhat smaller in external diameter than the interior diameter of the shell, so that they may be inserted and removed through the opening provided at the upper end of the shell when head 2 is removed therefrom, and to provide an annular space 8 between shell 1 and the trays.

The trays are individually supported from shell 1 in superimposed spaced apart relationship by means of lugs 9 provided at spaced points about the trays and corresponding lugs 10 provided on the shell of the reactor at correspondingly spaced points. In lowering the trays into the reactor, they may be oriented so that the lugs 9 thereon pass the lugs 10 on the shell until the proper level of the tray in the reactor is reached, whereupon they may be turned to interengage the lugs. This method and means of supporting the trays, in combination with the slip joint arrangement, which will be later described, for interengaging the adjacent trays of the assembly, permits independent longitudinal expansion and contraction of the shell and trays without the development of stresses due to differential expansion and contraction therebetween.

Each of the trays 7 contains a bed of solid granular catalyst or contact material, indicated at 11 in the cross-sectional view of the second tray from the top of the reactor illustrated. In the uppermost tray, which is also shown in section, the catalyst bed is omitted in order to better illustrate the details of construction of the tray.

Each of the trays is preferably provided, as in the case here illustrated, with substantially concentric spaced apart outer walls 12 and 13 and spaced apart bottom walls 14 and 15 between which suitable heat insulating material, such as, for example, rock wool, slag wool, glass wool, exfoliated vermiculite, asbestos-magnesia or the like, indicated at 17, is disposed to reduce heat transfer between the incoming reactants and reactivating gases and the catalyst beds in the trays, so that the reactants will not be substantially cooled as they pass through the annular space 8 between the trays and the shell 1 and the spaces 18 between the adjacent trays, and so that no substantial amount of heat will be supplied to the reactivating gases from the catalyst bed undergoing regeneration as the gases pass through the spaces 8 and 18.

Each of the trays 7 has a central pipe or conduit section 19 secured to the lower walls 14 and 15 and extending upwardly therefrom to above the top of the outer walls 12 and 13 so that an annular space is provided between conduit 19 and wall 13 on each of the trays for the reception of the bed of catalyst or contact material. The upper end of the member 19 on each tray is constructed and arranged to fit within and slidably engage the lower end of member 19 on the next succeeding higher tray of the assembly, as indicated at 20. A plurality of openings 21 are provided through the wall of member 19 adjacent its upper end and a screen 22 of sufficiently small mesh to prevent passage of the particles of the catalyst or contact material therethrough is provided over the openings 21. The openings 21 are disposed substantially at the upper level of the catalyst beds in the trays, but may extend above or beneath this level, or both, as illustrated in the drawing.

To lend rigidity to the trays, a plurality of substantially triangular radial ribs 23 are provided therein which extend from member 19 to wall 13 and are secured thereto and to wall 14 by welding or any other convenient manner. This gives the trays a truss-like construction which materially reduces the required weight of their walls for a given weight of catalyst or contact material.

A substantially cylindrical baffle 24 is provided on each of the trays with the exception of the lowermost and extends from wall 15, to which it is secured, downward to a point well beneath the top of the catalyst bed on the succeeding lower tray and somewhat above the bottom wall 14 of said lower tray. The baffle 24 is disposed intermediate and substantially parallel to members 13 and 19 and, preferably, the cross-sectional area of the space between wall 13 and baffle 24 is substantially the same as the cross-sectional area between the space between baffle 24 and member 19. For example, in a tray having a dimension A of 72 inches and a dimension B of 18 inches, the dimension C would be approximately 17 inches and the dimension D would be approximately 10 inches. Also, the distance from the bottom of baffle 24 to the upper surface of the bottom wall 14 is preferably such that the circular area of the space directly beneath the baffle through which the reactants and reactivating gases must be passed from one side of the baffle to the other is substantially equal to the aforementioned area at D and at C. With the other dimensions above given, this would make dimension E approximately 13½ inches. With this arrangement, the velocity of the reactants and reactivating gases passing through the catalyst bed is substantially uniform throughout the bed.

An extension 25 of nozzle 5 extends upwardly from the lower head 4 of the reactor shell and is slidably received at its upper end within the lower end of member 19 on the lowermost tray of the reactor in the same manner as the members 19 on adjacent trays are slidably engaged. Thus, members 19 and member 25 form a continuous central conduit extending from above the bed of catalyst on the uppermost tray through the several beds and trays to outlet nozzle 5 and communicating at openings 21 in members 19 with each of the spaces between adjacent trays on the inside of the baffles 24.

A deflecting member 26, which directs the incoming reactants and reactivating gases entering the upper end of the reactor into the annular space 8 between shell 1 and tray 7, is provided above the uppermost tray and mounted on member 19 of this tray in spaced relation from the upper extremity of walls 12 and 13 to provide a space 18' therebetween which is similar to the spaces 18 between adjacent trays of the assembly. This deflector 26 is preferably of double wall construction, as illustrated, with suitable insulating material 17' similar to the insulation 17 between the walls of the trays provided therebetween. A substantially cylindrical baffle 24', similar to the baffles 24, is secured at its upper end to member 26 and extends downwardly therefrom into the annular space occupied by the catalyst bed in the uppermost tray of the assembly.

In operation, as applied, for example, to the catalytic cracking of hydrocarbon oil vapors, the latter are supplied to the reactor in heated state through nozzle 3, directed by deflector 26 into annular space 24 between shell 1 and the trays 7 and flow downwardly therethrough. The lips 27 on deflector 26 direct heavy liquid particles which may be entrained in the incoming vapors against the inner surface of shell 1, over which the heavy liquid flows to the lower portion of the shell from which it is removed through drain line 6, thus preventing this liquid from coming in contact with and contaminating the catalyst beds in the trays.

In passing from space 8, the stream of hydrocarbon vapors therein is subdivided into a plurality of separate streams of substantially equal volume which flow into the spaces 18 between the adjacent trays on the outer side of baffles 24 and are directed downward through the outer portion of the catalyst beds and then around the baffles 24 and upward through the inner portion of the catalyst beds. The resulting conversion products pass from the upper portion of the space enclosed by baffles 24 through openings 20 in members 19 into the central conduit formed by these members, through which they are directed downward and from the reactor through outlet nozzle 5 to suitable separating and recovery equipment not pertinent to the present invention.

After a period of operation, such as above outlined, during which heavy hydrocarbonaceous conversion products of a deleterious nature are deposited in the catalyst beds to such an extent that regeneration of the latter is desirable, the stream of heated hydrocarbon vapors to be converted is diverted to a similar reactor containing fresh or freshly regenerated catalyst and wherein the cracking reaction is continued.

The reactor containing the contaminated catalyst is then substantially purged of hydrocarbon vapors and, after purging, hot reactivating gas, such as, for example, air diluted with combustion gases, carbon dioxide or other relatively inert gas, is supplied to the reactor through nozzle 3 and passes as a plurality of parallel streams of substantially equal volume through the catalyst beds in the same manner as the hydrocarbon vapors were previously passed therethrough. The deleterious hydrocarbonaceous deposits are thus burned from the catalyst and the resulting combustion products, together with the spent or partially spent reactivating gases, are directed from the reactor through nozzle 5. The reactor containing the regenerated catalyst is then purged of oxygen-containing gases and is ready for further use in conducting the cracking reaction.

In Figure 2, the trays 7' are similar in construction to the trays 7 of Figure 1 and corresponding portions thereof are indicated by prime numbers corresponding to those in Figure 1.

In place of the baffle 24 on the trays 7 of Figure 1, two substantially concentric baffles 30 and 31 are provided on the trays 7' and depend from the bottom member 15' of the trays at spaced points thereon. An upstanding substantially circular baffle 32 is provided on each of the trays 7' and extends upwardly from member 14' thereof well into the space occupied by the bed of catalyst or contact material in the tray. The baffles 30 and 31 are spaced from and protrude below the upper extremity of baffle 32 on the succeeding lower tray and the flow of reactants and regenerating gases through the catalyst bed is in the direction indicated by the arrows.

The trays 7' may be assembled in spaced apart superimposed relation within the reactor shell in the same manner as the trays 7 of Figure 1 and the general flow of reactants and regenerating gases in a reactor employing trays 7' is the same as that illustrated and above described in conjunction with Figure 1, except for the specific flow shown in Figure 2 through the catalyst beds.

I claim as my invention:

1. A reactor of the class described comprising, an elongated outer shell, a plurality of trays each adapted to contain a bed of granular contact material disposed within said shell in superimposed spaced apart relation, an annular space being provided between said trays and the shell, a centrally disposed conduit extending lengthwise of the shell through the space occupied by said beds of contact material in the trays, said conduit being provided with openings through its wall at the approximate level of the bed of contact material in each tray, continuous skirt-like baffles extending from the lower portion of the trays through the spaces between adjacent trays and into the space occupied by the bed of contact material on the succeeding lower tray of the assembly, means for directing fluid reactants into said annular space and therefrom through the beds of contact material about said baffles, and means for directing resulting fluid reaction products from each of the trays through said central conduit and from the reactor.

2. A reactor such as defined in claim 1, wherein said baffles are so spaced from the walls of the trays and from the central conduit that the velocity of the stream of fluid reactants and reaction products is substantially uniform throughout its path of travel through the bed of contact material on the individual trays.

3. A reactor such as defined in claim 1, wherein said central conduit comprises a plurality of longitudinal sections individual to the separate trays, said conduit sections being secured adjacent their lower ends to the bottom walls of their respective trays and being slidably engaged with the upper portion of the conduit section of the succeeding lower tray.

4. A reactor such as defined in claim 1, wherein the trays are individually supported from the shell of the reactor and wherein said central conduit comprises a plurality of longitudinal sections individual to the separate trays, said conduit sections being secured adjacent their lower ends to the bottom walls of their respective trays and being slidably engaged with the upper portion of the conduit section of the succeeding lower tray.

5. A reactor such as defined in claim 1, having a deflecting member spaced from and covering the uppermost tray of the assembly, said deflecting member being provided with a baffle, like that on the trays, which extends through the space between the deflecting member and the uppermost tray into the space occupied by the bed of contact material in the uppermost tray.

6. A tray for reactors of the class described comprising upstanding inner and outer tubular walls spaced apart and connected by a bottom wall to provide an annular space therebetween for the reception of a bed of granular contact material, and a continuous skirt-like baffle extending downward from said bottom wall and spaced a substantial distance from the extended planes of said inner and outer walls.

7. A tray such as defined in claim 6, wherein said central wall is attached adjacent its lower end to the bottom wall, extends above the upper extremity of the outer wall and is provided with openings therethrough adjacent its upper end.

8. A tray such as defined in claim 6 having a second outer wall and a second bottom wall spaced from the first named outer and bottom walls, respectively, and having heat-insulating material disposed within the spaces between said outer walls and said bottom walls.

9. A reactor of the class described comprising an elongated outer shell, a plurality of trays each adapted to contain a bed of granular contact material disposed within said shell in superimposed spaced apart relation, an annular space being provided between said trays and the shell, a centrally disposed conduit extending lengthwise of the shell through the space occupied by said beds of contact material in the trays, said conduit being provided with openings through its wall at approximately the level of the bed of contact material in each tray, concentric skirt-like baffles extending from the lower portion of each tray through the space between adjacent trays and into the space occupied by the bed of contact material on the succeeding lower tray of the assembly, an upstanding skirt-like baffle extending from a bottom wall of each tray upwardly into the space between said concentric baffles on the succeeding higher tray of the assembly, means for directing fluid reactants into said annular space and therefrom through each of the beds of contact material about said baffles and means for directing resulting fluid reaction products from each of the trays through said central conduit and from the reactor.

10. A tray for reactors of the class described comprising, upstanding inner and outer tubular walls spaced apart and connected by a bottom wall to provide an annular space therebetween for the reception of a bed of granular contact material, concentric skirt-like baffles extending downwardly from said bottom wall and spaced a substantial distance from each other and from the the extended planes of said inner and outer walls and a skirt-like baffle extending upwardly from said bottom wall into said annular space and disposed between the extended planes of the first named baffles.

11. A tray such as defined in claim 10, wherein said central wall is attached adjacent its lower end to the bottom wall, extends above the upper extremity of the outer wall and is provided with openings therethrough adjacent its upper end.

12. A tray such as defined in claim 10 having a second outer wall and a second bottom wall spaced from the first named outer and bottom walls, respectively, and having heat-insulating material disposed within the spaces between said outer walls and said bottom walls.

WILLIAM E. HULSBERG.